United States Patent [19]

Wu

[11] Patent Number: 5,201,540
[45] Date of Patent: Apr. 13, 1993

[54] COLLAPSIBLE GOLF CART

[75] Inventor: Fang-Li Wu, Tainan Hsien, Taiwan

[73] Assignee: Sports World Enterprise Co., Ltd., Tainan, Taiwan

[21] Appl. No.: 921,014

[22] Filed: Jul. 28, 1992

[51] Int. Cl.$^5$ .............................................. B62B 1/04
[52] U.S. Cl. .............................. 280/646; 280/DIG. 6
[58] Field of Search .......... 280/646, 651, 652, DIG. 6

[56] References Cited

U.S. PATENT DOCUMENTS

| | | | |
|---|---|---|---|
| 3,459,434 | 8/1969 | Dulaney | 280/DIG. 6 |
| 4,657,100 | 4/1987 | Lewis | 280/646 |
| 4,946,186 | 8/1990 | Cheng | 280/DIG. 6 |

FOREIGN PATENT DOCUMENTS 941603 11/1963 United Kingdom ......... 280/DIG. 6

Primary Examiner—David M. Mitchell
Attorney, Agent, or Firm—Morton J. Rosenberg; David I. Klein

[57] ABSTRACT

A collapsible golf cart comprising an upper frame, a lower frame, a connector connecting straight the upper and the lower frame in a collapsible fashion, an extensible rod extending in the upper frame and through a socket fixed around the top end of the upper frame and moving therein in a telescopic fashion to lengthen or shorten its length in relation to the upper frame so that this golf cart may be collapsed in very small dimensions for putting away or be folded or swung up in a straight lengthened position for using it as a golf cart.

2 Claims, 6 Drawing Sheets

COLLAPSIBLE GOLF CART

BACKGROUND OF THE INVENTION

A conventional collapsible golf cart as shown in FIG. 8, comprises an upper frame 10, a lower frame 20, a connector 30 connecting the two frames 10, 20 in a collapsible way, a club-bag supporter 40 fixed at a lower end of the lower frame 20, a connecting plate 601 and two feet 602, 602 respectively extending from the plate 601 to both sides for holding a wheel 603, a connecting rod 301 respectively connecting the connector 30 with the feet 602, an upper club-bag supporter 70 pivotally fixed on the upper end portion of the upper frame 10, a socket 80 fixed around the top end of the upper frame 10 and a thumb screw 801 screwing through the socket and the wall of the upper frame to immobilize an extensible rod provided to extend through a socket and in the interior of the upper frame to move therein in a telescopic fashion so that the length of the extensible rod can be adjusted for using this golf cart.

This conventional golf cart can become smaller by folding (or swinging) down the upper frame 10 and telescoping the extensible rod 90 inward in the upper frame 10 for storage or become usable for carrying golf clubs by folding (or swing) up the upper frame 10, telescoping the extensible rod 90 outward in the frame 10 and clamping a hinge 302 on the connector 20. The connector 30 has engaging projections 303 in two opposite sides to engage to keep immovable the upper frame 10 and the lower frame 20 in a straight position. However, after a certain period of use, this connector 30 may not function well, becoming rickety or shaky. Besides, a square hole provided in the socket 80 does not fit well with a circular extensible rod 90 so that the golf cart may sway to and fro when it is pulled along by holding a grip fixed at the outer end of the extensible rod 90.

SUMMARY OF THE INVENTION

This collapsible golf cart has been devised, in view of the disadvantages of the conventional collapsible golf cart mentioned above, to have advantages listed below.

1. A connector includes an upper connecting member and a lower connecting member to be separately fixed around a lower end of an upper frame and an upper end of a lower frame, and each connecting member has an elastic inclined-outward plate to contact and press against each other when both the frames are held in a straight position so that the connector can be kept in that straight position with considerable strength.

2. When this golf cart is to be collapsed when not in use, a locating hook in the connector can be pressed down to loosen the connector, allowing the upper connecting member together with the upper frame to be folded (or swung) down to lie nearly parallel to the lower frame.

3. This golf cart can be collapsed to very small dimensions by telescoping an extensible rod inward in the upper frame, folding a club-bag supporter 4 on the lower frame, pressing a locating hook 33 to disengage cuved notches 351, 351 from projections 333, 333, and folding (or swinging) down an upper frame together with the upper connecting member 33 and the locating hook 35.

4. A socket made of anti-slip plastic is provided in the end surface with a hole almost the same size and shape as the lateral cross-section of the extensible rod so that the extensible rod is always secure, passing through the hole and extending in the upper frame.

BRIEF DESCRIPTION OF DRAWINGS

The invention will be better understood by reference to the accompanying drawings, wherein.

DETAILED DESCRIPTION OF THE INVENTION

Figure 1:
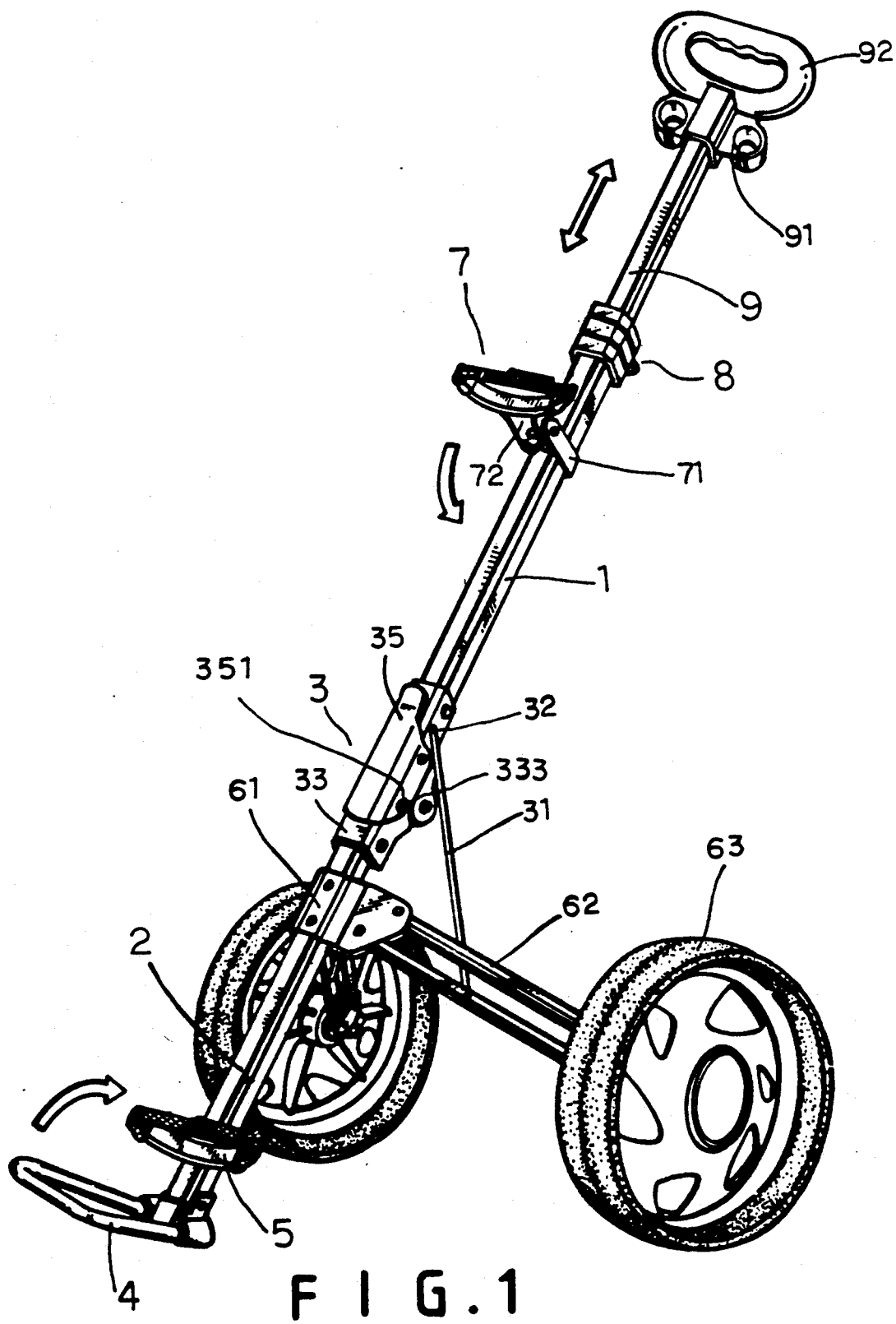
FIG. 1 is a perspective view of the collapsible golf cart of the present invention.
Figure 2:
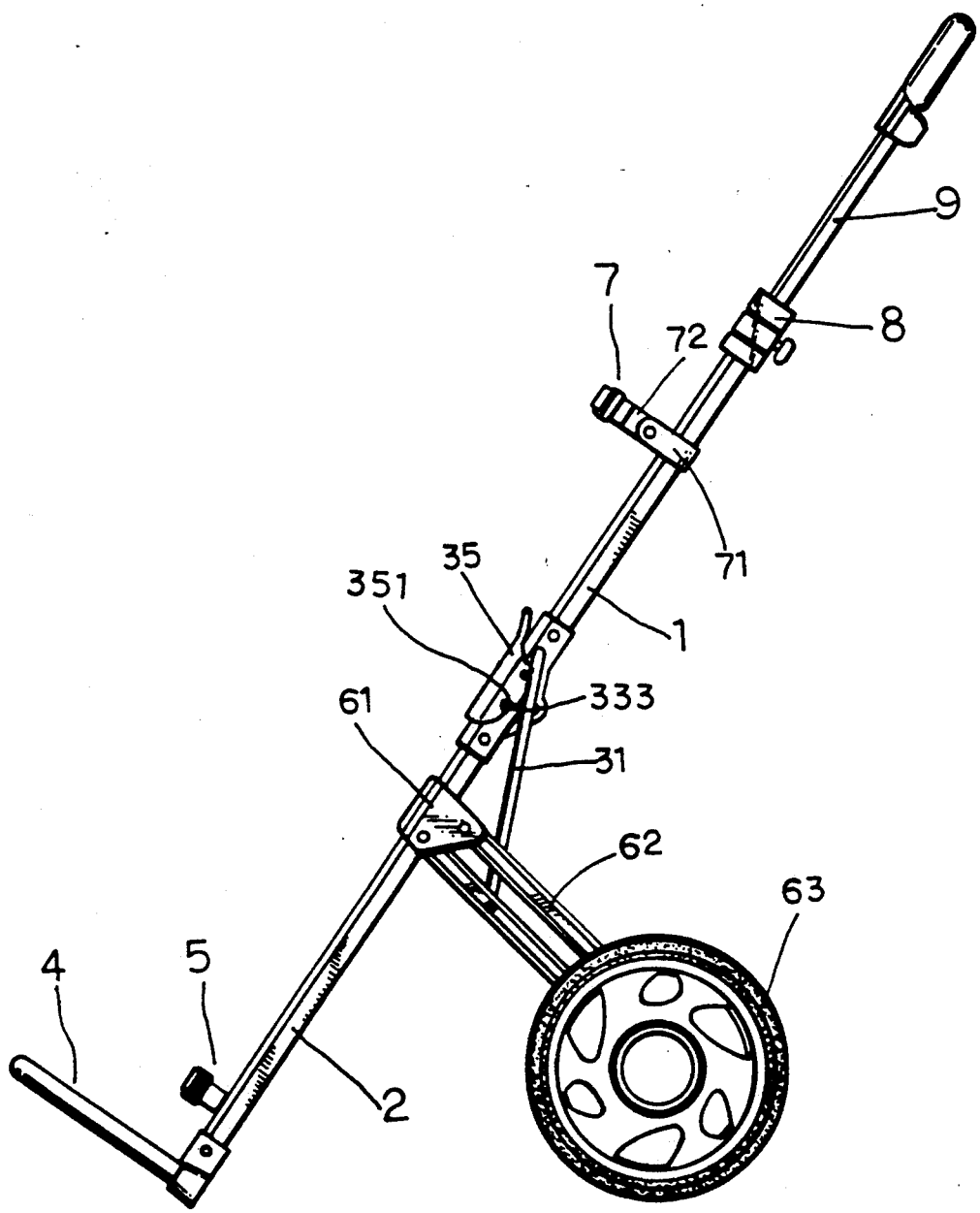
FIG. 2 is a side perspective view of the collapsible golf cart of the present invention.
Figure 4:
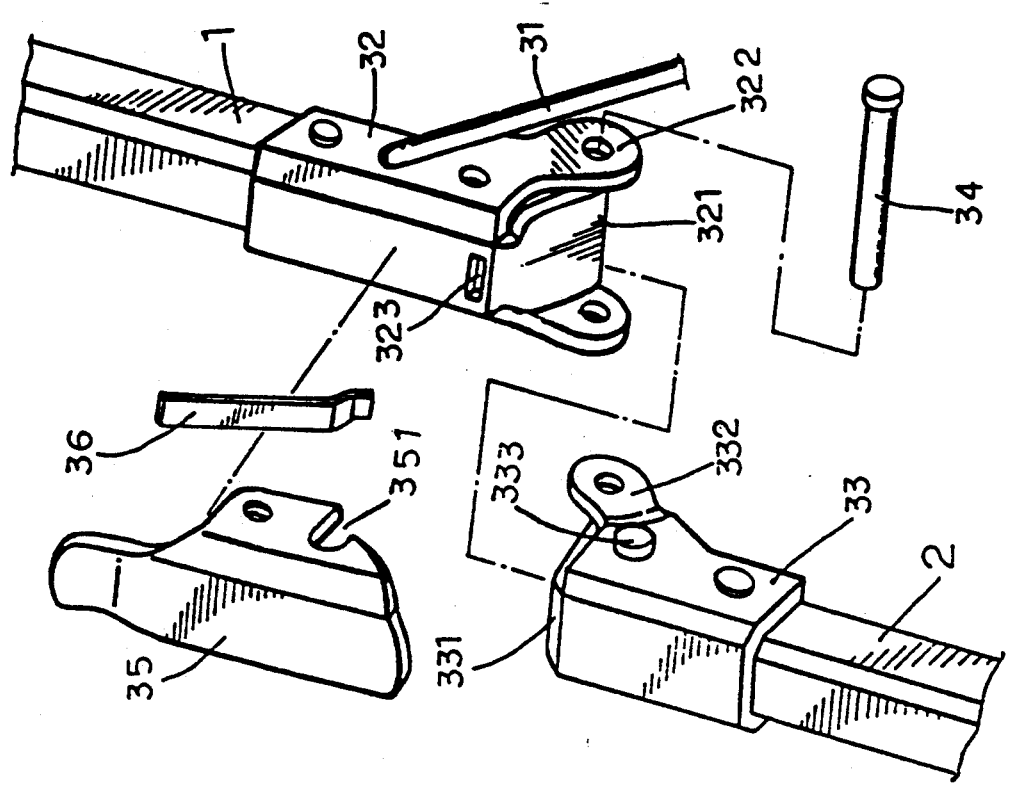
FIG. 4 is an exploded perspective view of a connector for connecting an upper frame with a lower frame in the collapsible golf cart in the present invention.

The collapsible golf cart in the present invention, as shown in FIGS. 1 and 2, comprises an upper frame 1, a lower frame 2, a connector 3 for connecting the upper and the lower frame 1, 2, a club-bag supporter 4, a lower club-bag rester 5, a connecting plate 61 for connecting two wheels 63, 63, an upper club-bag supporter 7, a locating socket 8 and an extensible rod 9 as the main components. But these components are known in the art.

What is improved in this invention is the connector 3 including an upper connecting member 32, a lower connecting member 33, two elastic plates 321, 331 placed between the two connecting members 32, 33. The two connecting member 32, 33 respectively have ears 322, 332 extending forward from their corresponding ends for a pin 34 to pass through to combine the two connecting members 32, 33 together pivotally with the pin 34 as a pivot. A locating hook 35 is provided to cover the upper surface of the upper connecting member 32 by means of a stud shaft and a hole, having a curved notch 351 in each of two opposite sides to engage a projection 333 in each of two opposite sides of the lower connecting member 33. An elongated plate spring 36 is provided between the locating hook 35 and the upper connecting member 32, having its bent end inserted in a hole 333 in the upper surface of the upper connecting member 32 so as to elastically bias the hook 35 upward.

Figure 5:
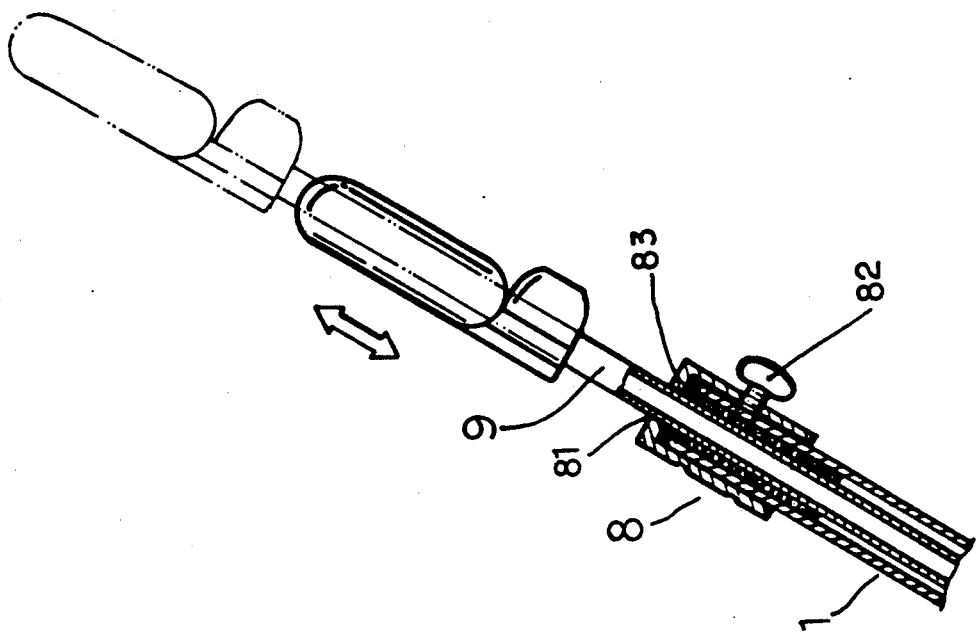
FIG. 5 is a perspective view of the connector being folded with the upper frame swung downward in the present invention.
Figure 6:
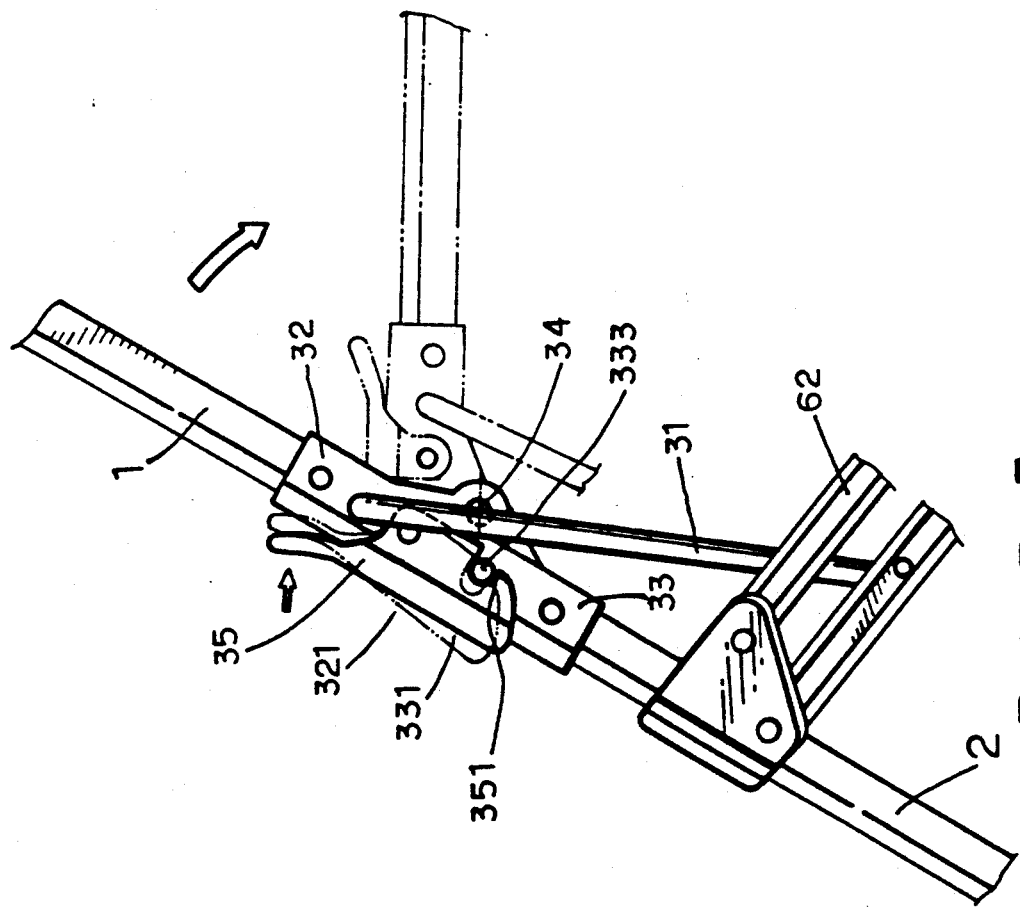
FIG. 6 is a perspective and partly cross-sectional view of an extensible rod extending in a telescopic fashion in the upper frame in the present invention.
Figure 7:
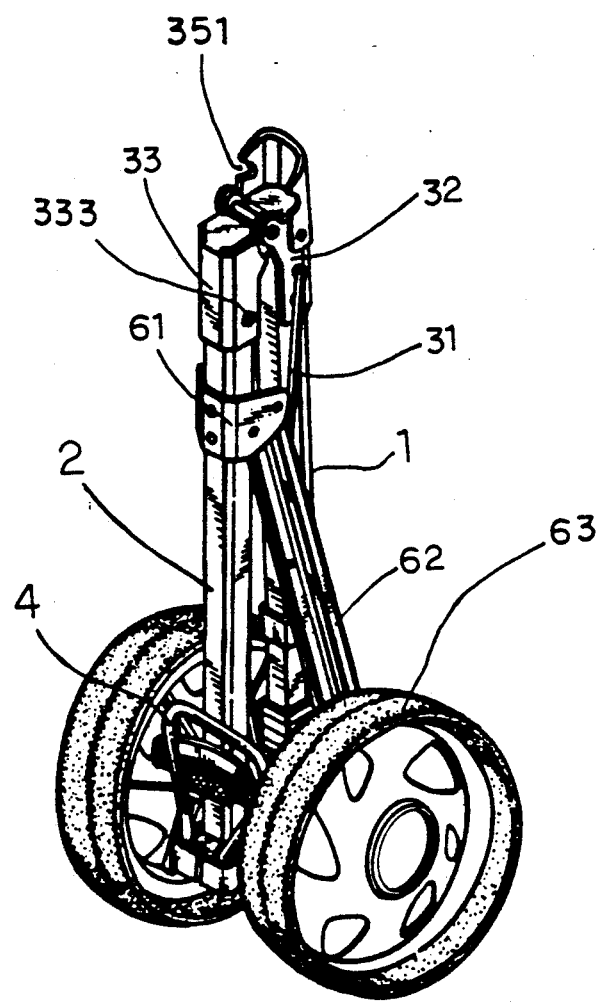
FIG. 7 is a perspective view of the collapsible golf cart collapsed for putting away in the present invention; and, FIG. 8 is a perspective view of a conventional collapsible golf cart.
Figure 8:
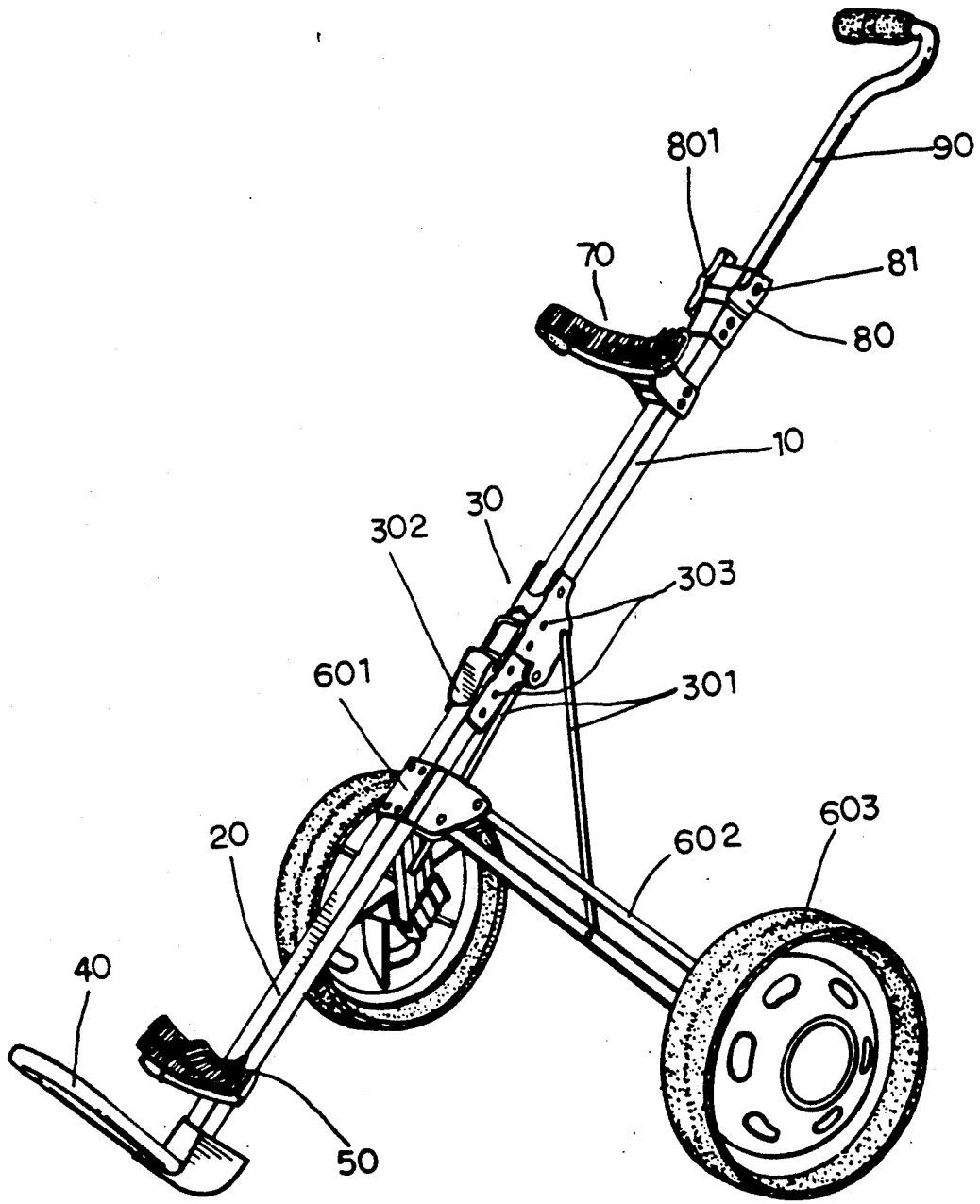

When the upper connecting member 32 is to be pulled (or swung) upward from a collapsed position shown in FIG. 7 to a straightened position shown in FIG. 1 or 5 to become in a straight line with the lower connecting member 33 for using this cart, the two inclined-outward elastic plates 321, 331 will come to contact and press each other, the two curved notches 351, 351 in the locating hook 35 will engage the two projections 333, 333 in the lower connecting member 33, and both the connecting members 32, 33 can be held in a straight position with a proper strength.

Figure 3:
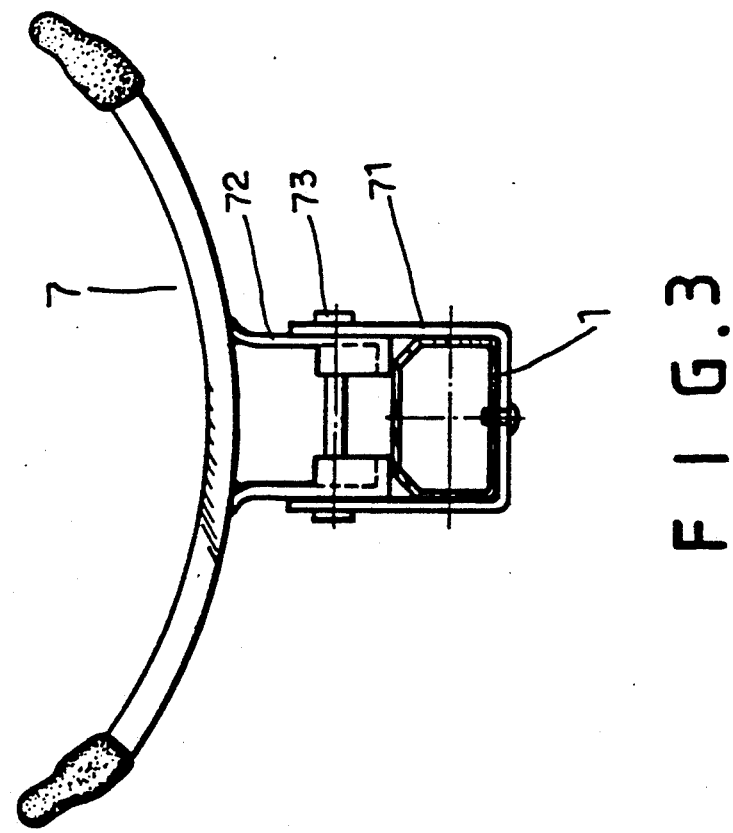
FIG. 3 is an upper view of a club-bag supporter in the collapsible golf cart in the present invention.

A U-shaped fixer 71, as shown in FIGS. 1 and 3, is attached on the upper portion of the upper frame 1, being combined with an upper club-bag supporter 7, which has two arms 72 extending parallel from the intermediate portion and being connected with two opposite sides in the C-shaped fixer 71 with two rivets 73, 73 so that the upper club-bag supporter 7 can be swung with the rivets 73, 73 as pivots, conveniently for use and putting away.

An anti-slip plastic socket 8 is provided to be fitted around the upper end portion of the upper frame 1, having a central hole 81 in the end surface to communicate with an inner passageway in the upper frame 1 so that the lower portion of the extensible rod 9 can move in the passageway in a telescopic fashion. And a cylindrical member 83 is placed inside the wall of the passageway in the upper frame 1 to contact around the rod 9. The square hole 81 is almost as large as the size of the rod 9 to keep it secure in the passageway in the frame 1. A thumb screw 82 screws through the socket 8 to press on the outer surface of the rod 9 to keep it immovable at an adjusted position. A grip 92 is attached at the outer end of the rod 9 to push this cart.

To collapse this cart, first, the thumb screw 82 in the socket 8 is loosened and the extensible rod 9 is telescoped inward in the upper frame 1 and then the clubbag supporter 4 is folded on the lower frame 2. Next, the locating hook 35 is pressed down to disengage the curved notches 351, 351 from the projections 333, 333 in the lower connecting member 33. Lastly, the upper frame 1 together with the upper connecting member 32 is folded or swung down with the pin 34 as a pivot, moving from the position shown in FIG. 2 to the position shown in FIG. 7 to lie nearly parallel to the lower frame 2. Then this cart has been collapsed to very small dimensions, convenient for putting away.

While the preferred embodiments of the invention have been described above, it will be recognized and understood that various modifications may be made therein and the appended claims are intended to cover all such modifications which may fall within the spirit and scope of the invention.

What is claimed is:

1. A collapsible golf cart comprising; an upper frame foldably connected with a lower frame by means of a connector and having a passageway for an extensible rod to fit therein from an upper end hole and move therein in a telescopic fashion;

a lower frame connected with said upper frame by said connector and combined with two wheels by means of a connecting plate and two feet respectively extending to both sides from the connecting plate and attached with a wheel at their outer ends, said connecting plate fixed to said lower frame;

said connector including an upper connecting member to be attached to a lower end of the upper frame, a lower connecting member to be attached to an upper end of the lower frame, a locating hook pivotally attached to the connecting member, and having a curved notch respectively in each of two opposite sides to selectively engage a projection in each of two opposite sides of the lower connecting member, two inclined-outward elastic plates respectively placed at the lower end of the upper connecting member and at the upper end of the lower connecting member to contact and press each other when said upper frame is folded or swung to become in a straight line with the lower frame, and an elongated plate spring placed between said upper connecting member and the locating hook to bias the locating hook to engage said notches with the projections on the lower connecting member; and, said extensible rod having a smaller size than the size of the passageway in the upper frame so as to move therein in a telescopic fashion to adjust the whole height of this golf cart, and having a grip fixed at an outer end thereof, said rod being held immovable at any of a plurality of positions in relation to the upper frame by a thumb screw screwing through a socket fixed to the upper end of said upper frame.

2. The collapsible golf cart as claimed in claim 1, wherein said frame members are tubular, said upper frame has a cylindrical member fixed in the inside upper end portion and a socket made of elastic anti-slip plastic fixed around the outside upper end portion, said socket having a hole in an end surface for said extensible rod to insert therethrough and extend to move in said cylindrical member in said upper frame in a telescopic fashion so as to be pressed immovable by a thumb screw screwing through said socket and the wall of said upper frame at any of a plurality of position adjusted in relation to said upper frame.

* * * * *